US012783807B2

(12) United States Patent
Brooks

(10) Patent No.: US 12,783,807 B2
(45) Date of Patent: Nov. 3, 2026

(54) AUTOMATIC DETECTION OF SENTIMENT BASED ON ELECTRONIC COMMUNICATION

(71) Applicant: Outreach Corporation, Seattle, WA (US)

(72) Inventor: Andrew John Brooks, Seattle, WA (US)

(73) Assignee: Outreach Corporation, Seattle, WA (US)

(*) Notice: Subject to any disclaimer, the term of this patent is extended or adjusted under 35 U.S.C. 154(b) by 318 days.

(21) Appl. No.: 17/813,024

(22) Filed: Jul. 15, 2022

(65) Prior Publication Data

US 2024/0020481 A1 Jan. 18, 2024

(51) Int. Cl.
*G06F 40/30* (2020.01)
*G06Q 30/0201* (2023.01)

(52) U.S. Cl.
CPC ......... *G06F 40/30* (2020.01); *G06Q 30/0201* (2013.01)

(58) Field of Classification Search
CPC .... G06F 40/30; G06F 40/186; G06Q 30/0201
See application file for complete search history.

(56) References Cited

U.S. PATENT DOCUMENTS

2015/0134389 A1 5/2015 Punera et al.
2017/0017971 A1* 1/2017 Moreau .............. G06Q 30/0202
2019/0122142 A1* 4/2019 Brunn .................... G06N 20/00
2019/0386949 A1* 12/2019 Vennam ................ G06F 16/334
2020/0344194 A1* 10/2020 Hosseinisianaki ...... G06F 40/30
2021/0136018 A1 5/2021 Hosseinisianaki et al.
2021/0144114 A1 5/2021 Hempton et al.

OTHER PUBLICATIONS

PCT International Search Report and Written Opinion, PCT Patent Application No. PCT/US2023/024055, Aug. 28, 2023, 8 pages.

* cited by examiner

*Primary Examiner* — Hai Phan
*Assistant Examiner* — Ian Scott McLean
(74) *Attorney, Agent, or Firm* — Fenwick & West LLP

(57) ABSTRACT

Methods and systems are disclosed for a workflow management system that includes a sentiment analysis system that uses a trained machine learning model to determine a sentiment label based on electronic communication data. The system may further evaluate the effectiveness of an existing outreach strategy and determine an action (e.g., send a follow up email, change a template for email, follow up with a call, etc.) based on results from the sentiment analysis model. The sentiment analysis system may use a machine learning model to perform sentiment analysis on content and related metadata of the electronic communication and determine one or more labels for the electronic communication. The sentiment analysis system may further use the machine learning model to determine a predicted action, where the action is predicted to have a positive reply rate from the prospect.

20 Claims, 12 Drawing Sheets

| Label | Description | Examples |
|---|---|---|
| Positive - Willing to meet | Shows an interest and willingness to meet beyond email exchange | • "How's your schedule looking on Friday?" |
| Positive – Need Information | Requests specific information. | • "Hi, What would we get out of your product?"<br>• "We would love to learn more." |
| Positive – Misc. Reasons | Answering representatives' questions, evaluating product, confirms right point of contact, etc. | • "I'm still interested, but I'm debating pros and cons with my clients." |

FIG. 6

| Label | Description | **Examples** |
|---|---|---|
| Objection – Already Has a Solution | Already have or are considering an alternative solution(s). | ● "Hi John, we are actually working on something internally that is the same concept". |
| Objection - Financial | The reason a prospect is not willing to engage is financially motivated. | ● "I love the platform, but unless there is a very tangible solid ROI line between the investment in your product and dollars booked, it will be a tougher sell than I have time to champion."<br>● "I'm interested but I checked out your site and you don't seem to have anything in my price range." |
| Objection – Bad Timing | Not willing to engage currently because of timing. | ● "We are swamped right now. I will contact you next week."<br>● "We are going in a different direction at this time – feel free to follow up in the summer." |
| Objection – Not right person | Not the right point of contact. | ● "I'm simply not the right resource. I have forwarded your information to my Operations Team."<br>● "Thanks for reaching out to Karen. She is no longer with the company."<br>● "I have retired." |
| Objection – Other reasons | Prospect shows an unwillingness to be engaged and/or provides a reason not covered by another Objection. | ● "My team is already working with Hank at your company and have a demo scheduled this week."<br>● "Thanks for reaching out. Not looking to upgrade at the moment." |
| Objection – No reason | No particular reason specified. | ● "Not interested."<br>● "No need." |

FIG. 7

| Label | Description | Examples |
| --- | --- | --- |
| Referral – specific contacts | Referral to a specific individual, not a department. | ● "I am in Sales. Please contact John." |
| Referral – Non-specific contacts | Referral to non-specific individuals. | ● "I'm not the right resource. I have forwarded your information to Operations Team."<br>● "I am on maternity leave and will return in March. Please contact sales." |

FIG. 8

| Label | Description | Examples |
|---|---|---|
| Other intents – CS/TS | Involving the USE of a Product/Service or a question where the Requesting information or assistance in dealing with a malfunctioning or not working as expected Product/Service. | Examples of CS/TS topics:<br>● Contracts<br>● Invoices<br>● Billing<br>● Adding accounts/seat/log-ins<br>● Updating contact information<br>● Opting into/out of a feature |
| Other intents – neutral statements | Any sort of neutral or non-committal response. | ● “Hey, how are you doing?”<br>● “Received Thanks.”<br>● “Thanks, I appreciate it!” |
| Other intents – left the company | The Prospect has left the company or is leaving the company, retired or for some other reason no longer an employee of the company. | ● “Thanks for reaching out to Karen. She is no longer with the company.”<br>● “I have retired.” |
| Other intents – unavailable | The Prospect is unavailable/unreachable or on vacation/leave for a specific period of time. | ● “I’m out of town this week, but I’ll be back next week.”<br>● “I am boarding a flight right now and I won’t be responding to emails while I’m on vacation.” |

FIG. 9

AUTOMATIC DETECTION OF SENTIMENT BASED ON ELECTRONIC COMMUNICATION

TECHNICAL FIELD

The present disclosure relates to sentiment detection. More specifically, the disclosure relates to a method and system for automatically detecting sentiments in email communication between a group of users and a group of target prospects.

BACKGROUND

Managing email relationships with a large number of people (prospects) is central to the role of a sales professional. In many cases, an individual may be reaching out to hundreds of prospects simultaneously. In order to be effective, each individual thread of communication must be maintained and followed up on. Moreover, the response (or lack of response) from a prospect requires action by the sales professional. This could include, but is not limited to, updating data within a Customer Relationship Management ("CRM") system, or setting up future follow-up activities based on a sentiment analysis on content of the response based on human judgements. Traditionally, the judgements and the follow-up actions are done manually and require considerable effort on the part of the salesperson. In the event of receiving responses from a large number of prospects or choosing from a large number of email templates to use for a follow-up conversation, completely relying on human decision for the future action of following up may result in decreased effectiveness and excess labor costs.

BRIEF DESCRIPTION OF THE DRAWINGS

FIG. 6 illustrates an exemplary guidance of a positive label for sentiment analysis, according to an embodiment.

FIG. 7 illustrates an exemplary guidance of an objection label for sentiment analysis, according to an embodiment.

FIG. 8 illustrates an exemplary guidance of a referral label for sentiment analysis, according to an embodiment.

FIG. 9 illustrates an exemplary guidance of a label of other intents for sentiment analysis, according to an embodiment.

Figure 1:
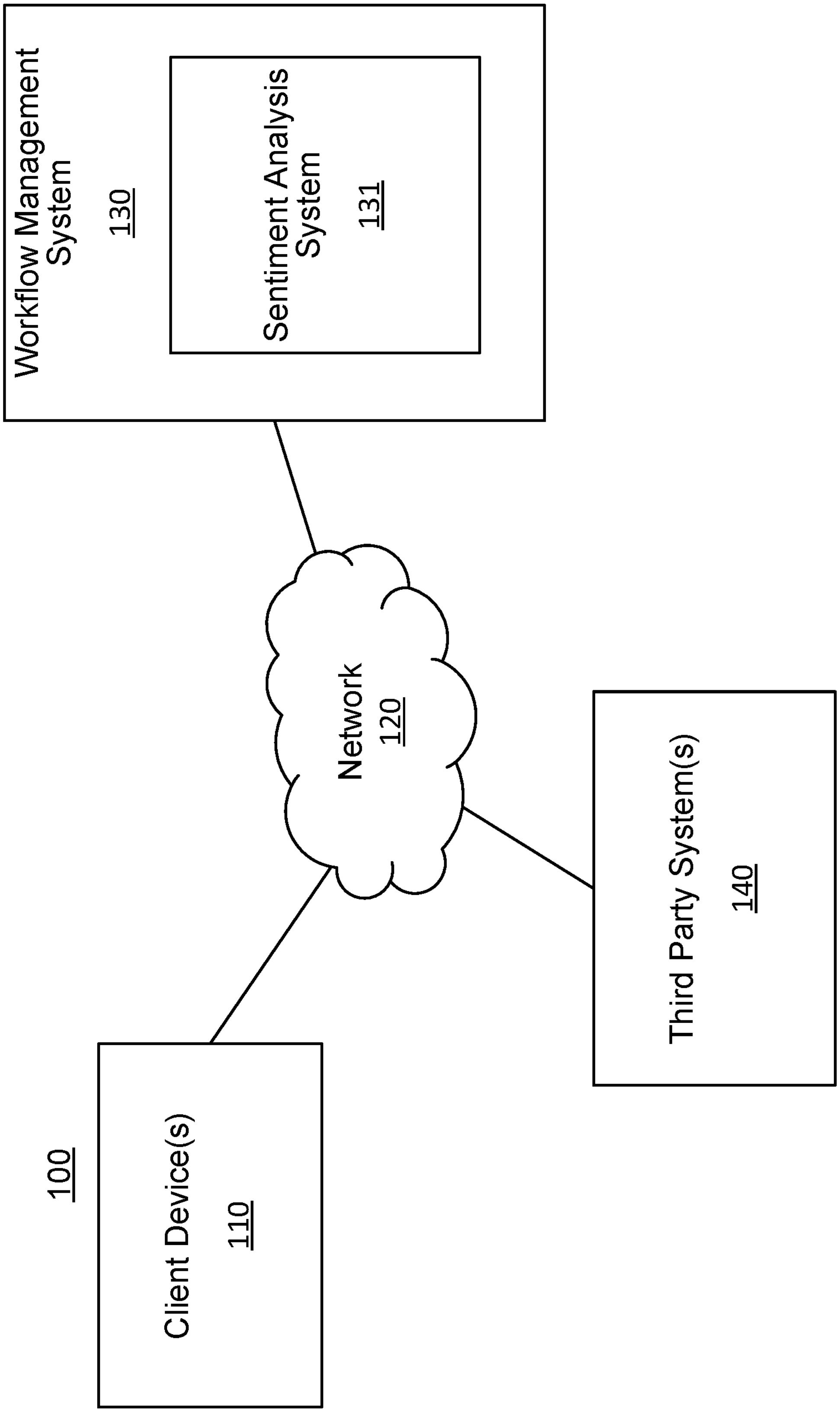
FIG. 1 illustrates a block diagram of a computing environment for a workflow management system including a sentiment analysis system, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein. Systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are reused to indicate correspondence between referenced elements.

Configuration Overview

Methods and systems are disclosed herein for a workflow management system. The workflow management system may include a sentiment analysis system that uses a trained machine learning model to determine a sentiment label (or may also be referred to as an intent label) based on electronic communication data. The sentiment analysis system may further evaluate the effectiveness of an existing outreach strategy and determine an action (e.g., send a follow up email, change a template for email, follow up with a call, etc.) based on results from the sentiment analysis model.

In one embodiment, the workflow management system may include an automated system to enable a user to send a series (or "sequence") of automated or manual emails to electronic accounts associated with specific recipients. The recipients may also be referred to as prospects. Each sequence is constructed as a number of "steps" consisting of templated email content. The sequence of emails may be based on a template, which may be an electronic framework that has predefined content. A template contains variables that are automatically populated from an underlying database containing additional information about intended recipients. The workflow management system may maintain connections to email mailboxes on behalf of many users.

In one embodiment, the system may contain logic to stop the delivery of a sequence conditioned on certain recipient behavior, such as receiving a response such as an email communication from a prospect to a sequence. The sentiment analysis system may use a machine learning model to perform sentiment analysis on content and related metadata of the electronic communication and determine one or more labels for the electronic communication. The sentiment analysis system may further use the machine learning model to determine a predicted action, where the action is predicted to have a positive reply rate from the prospect.

The sentiment analysis system may further train and use a machine learning model to handle cold start situations, where little or no historical replies are associated with a user. If the sentiment analysis system has seen little or no previous data associated with a user, the sentiment analysis system may train and use a machine learning model to categorize a set of templates provided by the user. The sentiment analysis system may train the machine learning model by identifying similar templates associated with other users. The machine learning model may use historical responses received for the identified templates as training data. The sentiment analysis system may then determine a sentiment category and predict a reply rate for the cold start template. The sentiment analysis model may further determine a follow-up action based on determined sentiment category and the predicted reply rate.

The sentiment analysis system may also provide a user interface for labeling training data. In one embodiment, the sentiment analysis system may include a labeling guide for human classifiers to categorize and label electronic information. The interface may include annotation tools and information (such as definition, description, and examples) helpful for human classifiers to categorize the electronic information. The sentiment analysis system may include a set of predetermined categories for labeling purposes. The predetermined categories may include a first level of categories, and each category of the first level may include one or more subcategories that are more specific.

Computing Environment for Workflow Management System

Referring now to Figure (FIG. 1, it illustrates a block diagram of an example computing environment 100 for a sentiment analysis system 131, according to an embodiment. Environment 100 includes one or more client devices 110, a workflow management system 130, a sentiment analysis system 131, and one or more third party systems 140 that communicate with each other over a network 120. FIG. 1 illustrates one client device 110 and one third party system 140, but there may be multiple instances of each of these entities, and the functionality of the workflow management system 130 may be distributed or replicated across multiple servers. Moreover, the client deice 110, workflow management system 130, sentiment analysis system 131, the network 120 and the third party system 140 may include and/or operate with one or more of the components of a computing device as illustrated and described with FIG. 12.

The client device 110, the workflow management system 130, and the third party system 140 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML).

The client device 110 may be a computing device capable of receiving user input as well as transmitting and/or receiving data via the network 102. In one embodiment, a client device 110 may be a smartphone, a tablet or a conventional computer system, such as a desktop or laptop computer. Alternatively, a client device 110 may be a device having computer functionality that accesses a set of mobile applications. A client device 110 is configured to communicate via the network 120. In one embodiment, the client device 110 executes a mobile application allowing a user of the client device 110 to interact with the workflow management system 130. For example, the client device 110 executes a browser application that may enable interaction between the client device 110 and the workflow management system 130 via the network 120. In another embodiment, a client device 110 interacts with the workflow management system 130 through an application programming interface (API) running on a native operating system of the client device 110, such as IOS® or ANDROID™.

In one embodiment, the client device 110 is operated by a user (e.g., sales representative, marketing personnel, manager, recruiter) associated with an organization (e.g., a company). The client device 110 may receive input from the user and perform a sequence of steps in a workflow. As used herein, the term "workflow" refers to a sequence of steps involving one or more different types of actions performed in a predetermined order. The types of actions included in a workflow depends on the context in which the workflow is used. The term "context" refers to circumstances or a scenario in which a workflow is used. Context can be represented by a set of context attributes. Examples of context attributes include industry (e.g., technology, finance, legal, sports, entertainment), language used to perform the steps of the workflow, role of target audience (e.g., sales leader, CFO, partner, engineer), role of user performing the workflow (e.g., sales representative, human resources personnel, lawyer, manager), demographics of target audience (e.g., geography, age), or other such attributes. The sequence of steps in the workflow are arranged to have a particular structure. The term "structure" refers to an arrangement of steps in a workflow. Structure can be represented by a set of structure attributes such as a number of steps in the workflow, order in which the steps are performed (e.g., calling a customer and then emailing the customer vs. emailing the customer and then calling the customer), a time at which one or more steps are performed (e.g., step 2 performed on Sunday at 2 pm), a time duration to wait before or after a step (e.g., 24 hours before step 2, 48 hours after step 2), type of call script, type of email template, or other such attributes.

In one embodiment, the client device 110 may send a sequence of emails to a prospect using one or more email templates. A "template" may be an electronic framework that has predefined content. A template may contain variables that are automatically populated from an underlying database containing additional information about intended recipients. A "sequence" may be a series of emails sent to prospects. The sequence of emails may be based on a same template or multiple different templates. For example, a first email template in a sequence may be an initial outreach email, with subsequent emails in the sequence being follow up emails. In one embodiment, a sequence may be interrupted by receiving a response from the prospect. The workflow management system 130 may stop sending templated emails in the sequence to a prospect if the prospect responded to the sequence.

Figure 2:
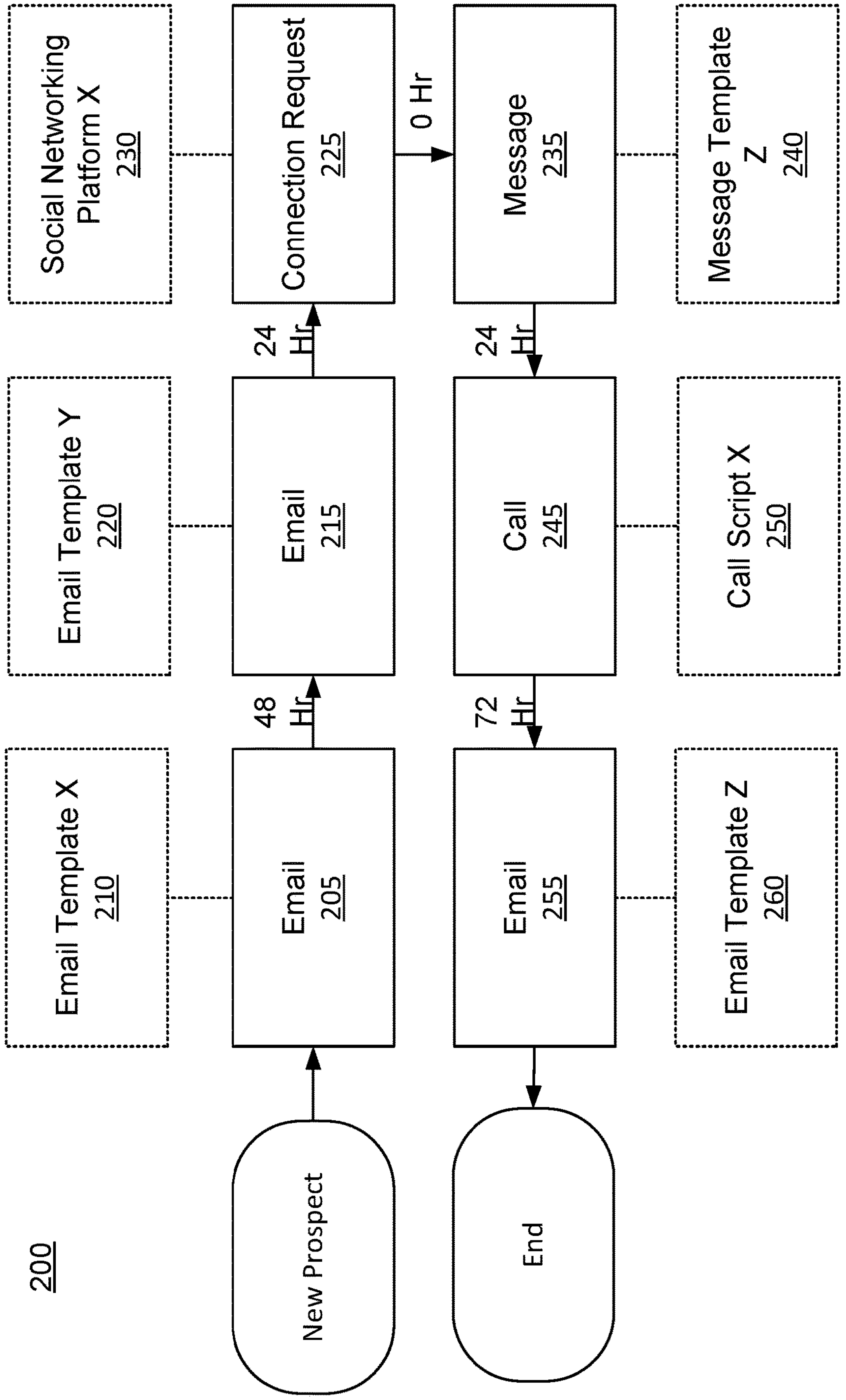
FIG. 2 illustrates an exemplary workflow, according to an embodiment.

An exemplary workflow 200 is illustrated in FIG. 2. In one embodiment, the workflow 200 is intended to be performed by a recruiter for a company in the technology industry to receive a response from a prospect at the company. The exemplary workflow 200 includes a first step 205 of sending an email according to email template X 210, a second step 215 of sending a second email according to email template Y 220, a third step 225 of sending a connection request on social networking platform X 230, a fourth step 235 of sending a message according to message template Z 240, a fifth step 245 of calling according to call script X 250, and a sixth step 255 of sending a third email according to email template Z 260. The types of actions (e.g., email, connection request, message, call) performed in each of the steps, order of the steps, and time in between steps may be specified by a user associated with the workflow. In another exemplary workflow for performing user onboarding may include steps of account creation, account activation, notifications to introduce new product features, reminders to perform a task, or other onboarding related actions. The steps of a workflow are not independent of each other. For example, in the workflow 200, the email sent in the second step 215 may reference information shared in the email from the first step 205, and the message sent in the fourth step 235 may reference information shared in the email from the first step 205 or the email sent in the second step 215. A workflow may include any number of steps, any combination on types of actions, and any structure. Depending on the workflow, performance may be measured using one or more metrics such as number of meetings booked, number of email responses, number of answered calls, amount of revenue, average time to receive positive response, user ratings, or other indicators.

Because it may be difficult to keep track of the status of workflows, especially when responsible for a large number of workflows at the same time, the client device 110 may use functions of the workflow management system 130 to perform the steps of the workflow. For example, the workflow management system 130 may be integrated with the plurality of third party systems 140 (e.g., an email provider for an emailing step, a social networking system for a friend request step), allowing the client device 110 to perform the steps in the workflows from one platform. In some embodiments, the workflow management system 130 may be automated to perform one or more of the steps of workflows (e.g., send a follow up email). In other embodiments, the workflow management system 130 may track the progress of workflows and sends notifications to the client device 110 to notify a user that it is time to perform a next step of a workflow (e.g., a reminder to perform step 2 of workflow XYZ in 15 min by making a phone call to a potential client). Furthermore, since the workflow management system 130 manages a large variety of workflows and has insights on successful and efficient workflows, the client device 110 may send a request to the workflow management system 130 for a recommendation on changes that could be made to optimizing a target workflow of the client device 110. The client device 110 may have an application installed thereon to access the functions of the workflow management system 130.

The system environment 100 may additionally include one or more third party systems 140. One or more steps of a workflow may be performed using services of a third-party system 140. For example, a third-party system 140 may be a social networking system, an email service provider, a call application provider, an advertising network, an advertisement publisher, or other types of service providers. The workflow management system 130 may be integrated with the one or more third party systems 140 using APIs, and the steps in workflows performed using functions of the one or more third party systems 140 may be executed through the workflow management system 130.

Figure 3:
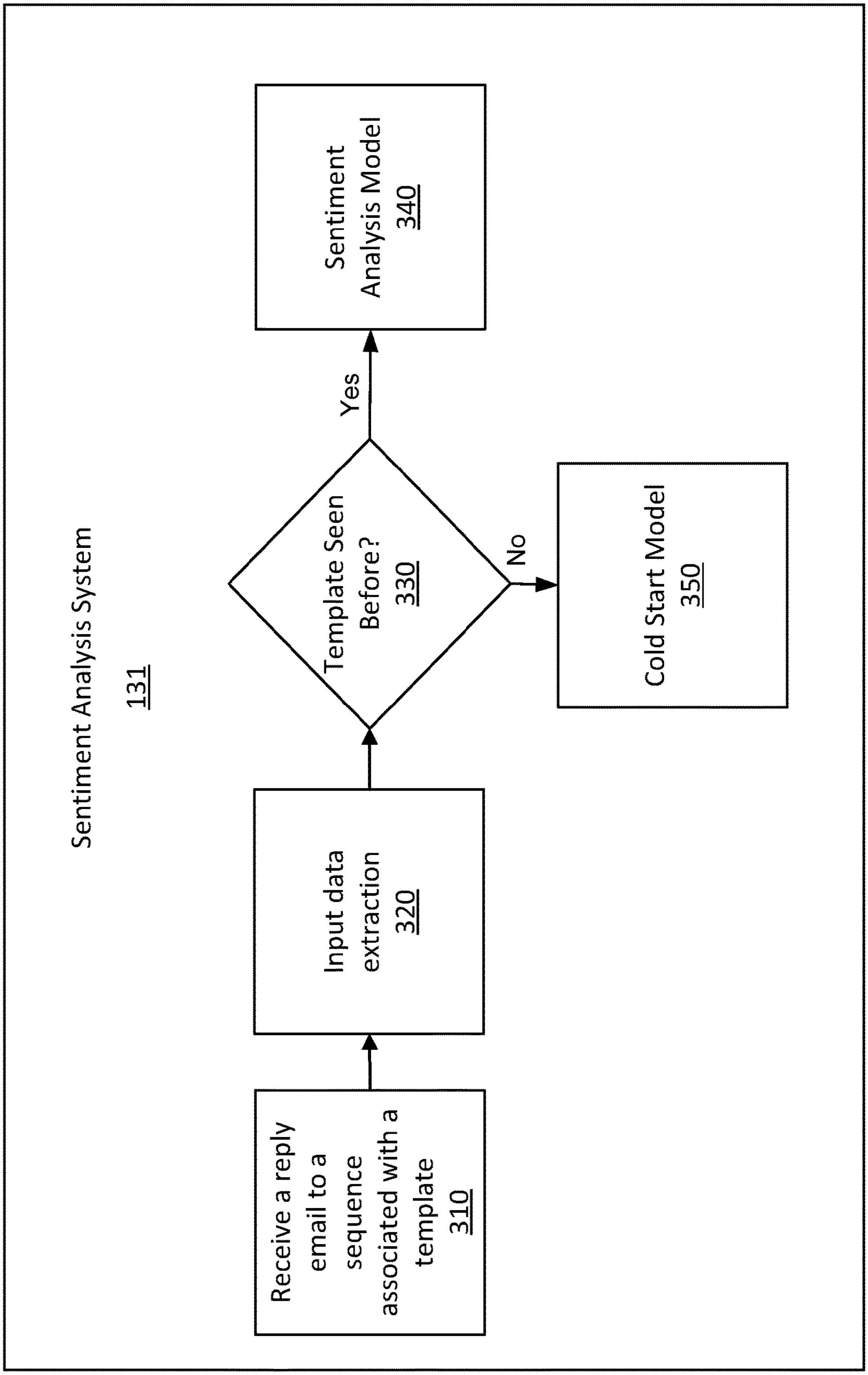
FIG. 3 illustrates a block diagram of modules and databases used by a sentiment analysis system, according to an embodiment.

FIG. 3 illustrates an exemplary embodiment of a sentiment analysis system 131. The sentiment analysis system 131 may start a sentiment analysis process with receiving 310 a reply email to a sequence associated with a template. A sequence may be a series of outbound emails to be sent to a prospect, spaced out by predetermined time intervals. In one embodiment, the workflow management system 130 may include an automation system that sends sequences of electronic communication to prospects. In one embodiment, every sequence step may map to an email template. Each email template may contain template variables to be populated based on information corresponding to each prospect. The sentiment analysis process may be initiated when a response to a sequence is received from an electronic account associated with a prospect.

The sentiment analysis system 131 may then perform input data extraction 320 for generating input data to the sentiment analysis model 340 and cold start model 350. In one embodiment, the sentiment analysis system 131 may extract data from body content of the response (e.g., body of an email). In some embodiments, the sentiment analysis system 131 may also use any information associated with the prospect and the user for sentiment analysis. For example, sentiment analysis system 131 may extract metadata of the email, such as email headers, user identifiers, prospect identifiers, names of recipients, names of senders, etc. The extracted information may be then used in a machine learning model for sentiment analysis, for example as input to a sentiment analysis model 340 or a cold start model 350, based on a determination whether the workflow management system 130 has seen 330 the template before. If the workflow management system 130 has seen the template associated with the sequence before, the sentiment analysis system 131 may use a sentiment analysis model 340 for sentiment categorization based on historical replies associated with the template. If the workflow management system 130 has not seen the template associated with the sequence before, the sentiment analysis system 131 may use a cold start model 350 for sentiment labeling based on prior knowledge associated with other users with similar templates. The sentiment analysis model 340 and the cold start model 350 are discussed in greater detail in accordance with FIG. 4 and FIG. 10.

Sentiment Analysis Model Training Process

Figure 4:
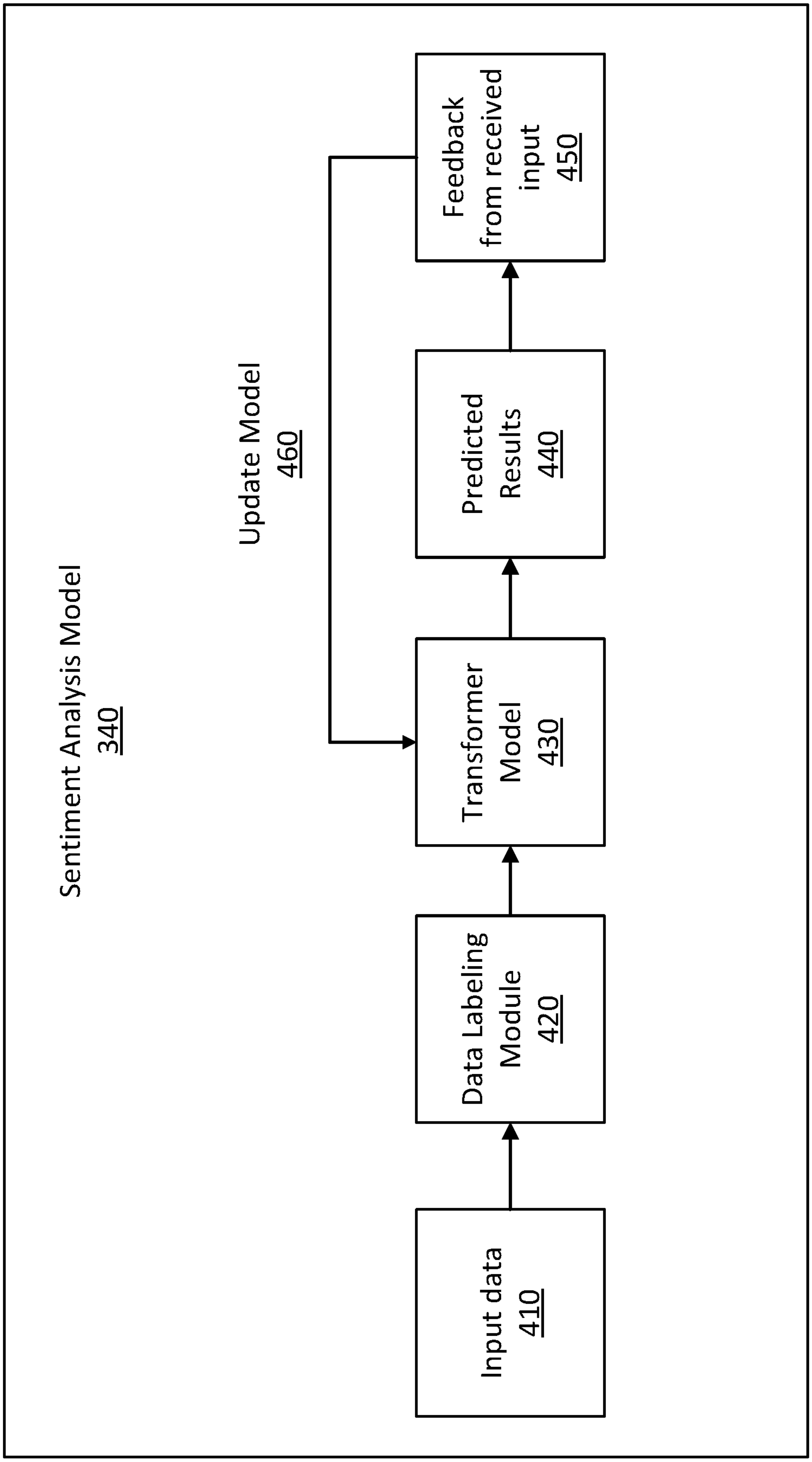
FIG. 4 illustrates an exemplary training process for a sentiment analysis model, according to an embodiment.

FIG. 4 illustrates an exemplary training process for a sentiment analysis model 340. The process may start with obtaining input data 410 that include an electronic communication received from a prospect and an email template associated with the electronic communication. In one embodiment, the input data 410 may be an email with an email body and metadata such as header and names. The email body may include textual information or data that can be transformed into textual information such as voice mail or call scripts. The sentiment analysis model 340 may then pass the input data 410 to a data labeling module 420 for generating labeled training data. The data labeling module 420 is further discussed in accordance with FIGS. 5-9.

The data labeling module 420 may label input data 410 based on a set of pre-determined labels. In one embodiment, the data labeling module 420 may provide instructions and user interface to human classifiers for determining one or more intents associated with an electronic communication. The human classifiers may be instructed to determine a label or multiple labels appropriate for the electronic communication. In one embodiment, the data labeling module 420 may label electronic communications using a machine learning classifier that labels training data based on the template and the labeled data may be further verified by qualified human classifiers. The data labeling module 420 is discussed in detail in accordance with FIGS. 5-9.

Figure 5:
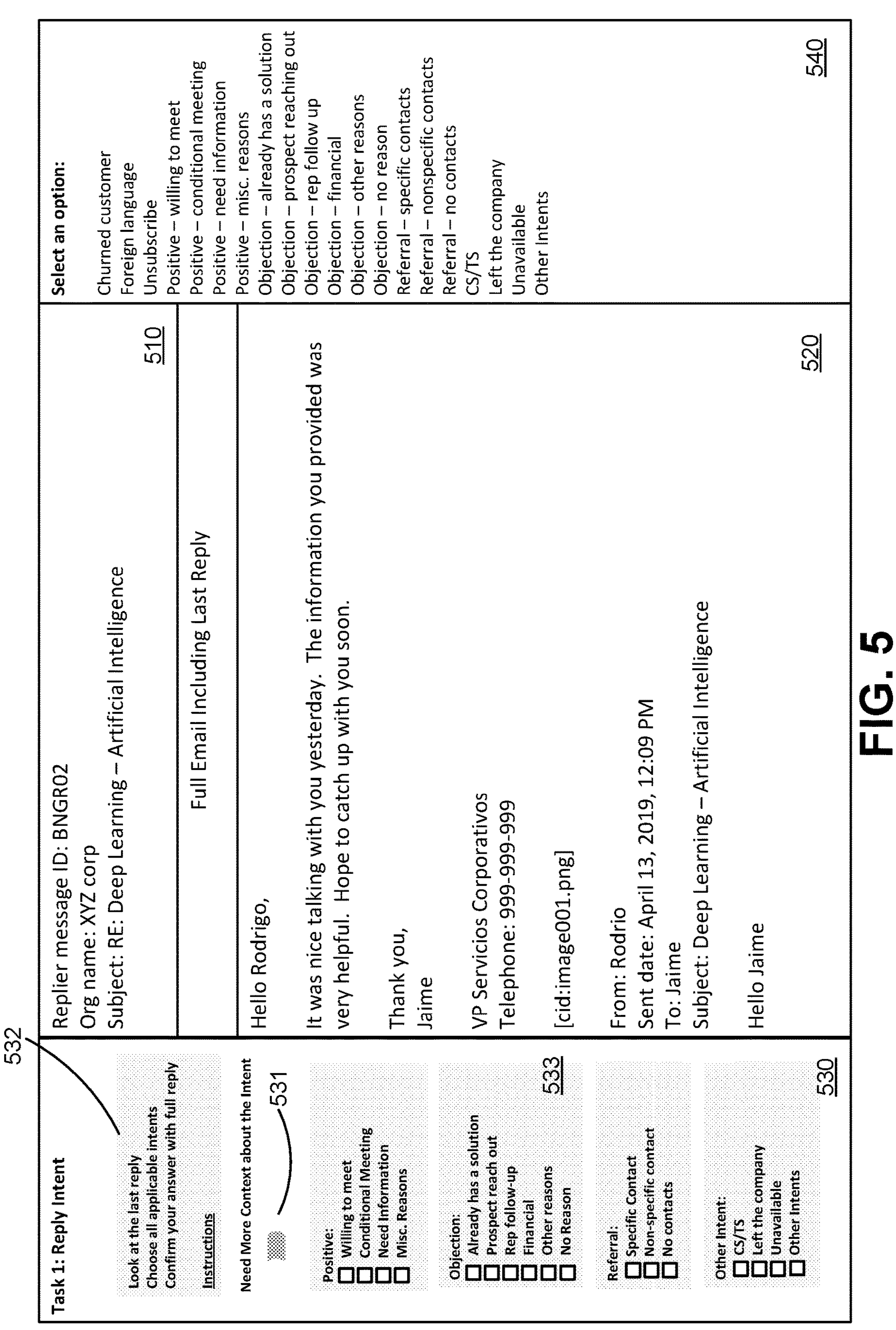
FIG. 5 illustrates an exemplary user interface for sentiment labeling, according to an embodiment.

Turning briefly to FIG. 5, it illustrates an exemplary user interface provided by the data labeling module 420 for human classifiers to label electronic communications. The interface illustrated in FIG. 5 may include data associated with the electronic communication including metadata 510 and body content 520. The header 510 may include information such as a replier message ID, organization name associated with the replier, and subject of the email. The body content 520 may include electronic information received from a prospect as a response to a sequence. In one embodiment, the body content 520 may include a last reply from the prospect. The body content 520 may also include a full reply including entire email sequence with the last reply from the prospect.

The exemplary user interface illustrated in FIG. 5 may include a left panel 530 with guiding questions and instructions for human classifiers to categorize the electronic communication. The left panel 530 may include instructions 532 or links to a separate user interface with instructions. The left panel 530 may also include a button 531 for a human classifier to indicate that additional context may be needed for determining an intent (e.g., label). In one embodiment, the left panel 530 may include a dropdown menu for selecting a language corresponding to the electronic communication. The left panel 530 may also include a button for a human classifier to indicate whether the prospect is associated with a churned customer. For example, if a client leaves or withdraws permissions to use data associated with the client, a human classifier may be instructed to mark the client as a churned customer. The left panel 530 may also include a button for a human classifier to indicate if the interface only displays a reply from the prospect without showing emails from the sales professionals.

The left panel 530 may further include section 533 that displays a set of pre-defined labels. In one embodiment, an email or a sentence in the email may be associated with multiple intents. A human classifier may be instructed to choose one or more preliminary intents from the left panel based on the last reply from the prospect. The user interface may include a right panel 540 for a human classifier to select a primary intent. The primary intent may be a label selected from the multiple intents identified from the left bar 530 based on a review of the full reply of the chain of electronic communication. In one embodiment, the primary intent conveys an overall and primary intent of the electronic communication that needs to be addressed sooner than other identified intents. For example, if the email is associated with an intent that needs to be addressed within a day and other intents that need to be addressed within a month, the intent that needs to be addressed within a day may be selected as the primary intent. In one embodiment, a primary intent may be an intent that can address the most concerns raised in the email. In some embodiments, a primary intent may be determined based on an overall tone of the electronic communication. In the situation where a human classifier is uncertain about the intent and may need help, the user interface may provide contact information, or a link associated with an annotation expert for additional help. In some embodiment, the exemplary user interface may include additional features such as language selection if the electronic communication is in a foreign language. A human classifier may use the user interface to select a language corresponds to the email.

FIGS. 6-9 illustrate exemplary guidelines provided to human classifiers for determining intents. In one embodiment, the instructions may be accessed from the user interface illustrated in FIG. 5. FIGS. 6-9 demonstrate guidelines for intents positive, objections, referral and other intents. The exemplary guidelines are for illustration purposes and the possible intents are not limited by the intents listed. In one embodiment, the pre-defined intents may include a first level of high-level intents, including but not limited to, positive, objections, referral, and other intents. Each of the high-level intent may further include a second level of intents each focusing on a more specific category. In one embodiment, the guidance may include multiple columns including a column that shows names of labels, a column for description, and a column for examples corresponding to each label. The description may outline guidelines and criteria that make an email communication qualify as a respective label. The description may specify exemplary key words, enumerate alternatives, provide remarks and notes, provide guiding questions for determining a label, provide guiding definitions for terms, and provide remarks on distinguishments between labels that may be confused with. Each of FIGS. 6-9 demonstrates an exemplary guidance for intents, positive, objection, referral, and other intents, respectively, which are discussed in further detail.

FIG. 6 illustrates an exemplary guidance for positive intents. In one embodiment, the positive intents include but are not limited to willing to meet, conditional meeting, need information, miscellaneous reasons. The positive—willing to meet label may refer to when a prospect shows an interest and willingness to meet, not just through electronic communication, with the sales representative. The description may further include exemplary texts including phrases that indicate a corresponding intent. For example, the sentence "How's your schedule looking on Friday" may indicate a willingness to meet. The guidance may also emphasize one or more words that are associated with a strong indication of the corresponding label. For example, the guidance may mark a phrase "very interested" in a different font, such as bold or highlight. The examples may also include examples that do not qualify under the corresponding category. For example, the examples may include a non-qualified example such as "would it be ok if we touch base then." The non-qualified example may be following with a remark indicating that "touch base" does not necessarily mean a meeting but is highly likely to be another electronic communication. Similarly, a "positive conditional meeting" label may refer to the situation when a prospect agrees to meet if certain conditions are met. A positive label may also include a "positive—need information" label which refers to a situation when the prospect requests specific information.

FIG. 7 illustrates an exemplary guidance for objection intents. The objection intent may further include one or more of the following: objection—already has a solution, where a prospect indicates that alternative solutions are being considered, objection—prospect reach out, where a prospect indicates that the client does not want to engage now and the client may reach back at a future date; objection—rep follow up, where a prospect indicates that the client does not want to engage now and proposes a time in the future to restart the discussion; objection—financial, where the prospect indicates that the reason not willing to engage is financially motivated; objection—other reasons, where the prospect shows an unwillingness to be engaged and/or provides a clear and actionable reason that is not covered by another objection category; objection—no reason, where the prospect shows a general lack of willingness to be engaged and gives no reason. In some embodiment, the objection intents may include more subcategories that may be categorized under an objection label.

FIG. 8 illustrates an exemplary guidance for referral intents. The referral intent may further include one or more of the following: referral—specific contacts, where the prospect is not the right person and directs the sales professional to specific contacts, referral—non-specific contacts, where the prospect is not the right person and directs the sales professional to non-specific contacts, referral—no contacts, where the prospect is not the right person and directs the sales procession to a vague contact or does not provide a correct contact. In some embodiment, the referral intents may include more subcategories that may be categorized under a referral label.

FIG. 9 illustrates an exemplary guidance for other intents. The other intents may further include one or more of the following: other intents— CS/TS (Customer Support/Technical Support), where an issue is raised involving the use of a product or service, other intents—neutral statements, which involve neutral or non-committal response, other intents—left the company, where the prospect is no longer an employee with the company, other intents—unavailable, where a prospect is unavailable or unreachable for a period of time, the prospect indicating a willingness to continue the ongoing conversation. The other intents may include additional intents such as unsubscribe, where a prospect requests to opt out for any and all future contact. In some embodiment, the other intents may include more subcategories that are not categorized under any other labels.

Referring back to FIG. 4, the data labeling module 420 may generate labeled data and pass the labeled data to a transformer model 430. In one embodiment, the transformer model 430 may be a machine learning model pipeline that includes one or more sub-models for different functionalities, such as tokenizing data, part-of-speech tagging, parsing data, assigning lemmas, using transformers, etc. The transformer model 430 may generate predicted results 440, including predicted categories for each electronic communication. Based on the predicted categories, the sentiment analysis model 340 may predict a positive reply rate for a template. In one embodiment, the positive reply rate may be calculated as the ratio of the number responses that are predicted to have a positive intent over the number of times the template is used. For example, a template may be used 200 times, and based on the predicted results 440, 50 replies are categorized as positive replies. The sentiment analysis model 340 may determine that a positive reply rate for the template is 25% which is 50/200. In some other embodiment, the positive reply rate may be calculated using the predicted categories in different ways. For example, the sentiment analysis model 340 may determine that a positive reply rate to be the number of positive replies over the number of replies received. In some other embodiments, the number of positive replies may include not only the positive replies, but also responses labeled as other categories, such as referral or other intents.

The predicted results 440 may also include predicted follow-up actions based on the predicted intents. In one embodiment, the sentiment analysis model 340 may further recommend one or more follow-up actions that are predicted to have a positive reply rate. Each intent of the pre-defined intents may be associated with one or more corresponding follow-up actions. The corresponding actions may be developed and provided by sales professionals of a user. A follow-up action may be following up with another template, following up with a call, following up with a meeting, directing to another contact, etc. based on the predicted intents. In the situation where a follow-up action is following up with another template, the sentiment analysis model 340 may recommend a template predicted to have a positive reply rate. For example, the sentiment analysis model 340 may categorize a response as objection—timing/financial reasons, and the sentiment analysis model 340 may further determine (e.g., based on information provided by the user) that one of the potential follow-up actions is to follow up with another template that proposes a different timing or possibilities for negotiation. The sentiment analysis model 340 may then recommend from existing templates that may address the issue, with the recommended template having a positive reply rate. The sentiment analysis model 340 may also recommend multiple templates with positive reply rates. In some embodiments, the sentiment analysis model 340 may recommend one or more templates based on a ranking of the templates, the ranking determined based on the positive reply rates. For example, the sentiment analysis model 340 may recommend one or more templates associated with positive reply rates greater than a pre-determined threshold, or the sentiment analysis model 340 may recommend the top three ranked templates.

The sentiment analysis model 340 may pass the predicted results 440 to the users and may collect feedback 450 from, for example, input of the users. In a training process, the predicted results 440 are passed to a user and the user may review the predicted results such as predicted intents and predicted actions and determine whether the user approves the predicted results. In response to receiving feedbacks from the users, the sentiment analysis model 340 may update 460 the model by retraining the model using training data updated based on user feedbacks. For examples, if the received feedback indicates that a response corresponds to another intent, the sentiment analysis model 340 may relabel the data entry with the intent indicated by the user and retrain the model. In some embodiments, the sentiment analysis model 340 may associated different data records with different weights, such that the labels confirmed by the users are weighted more comparing to the data records labeled by human classifiers in the training process.

Cold Start Prediction

Figure 10:
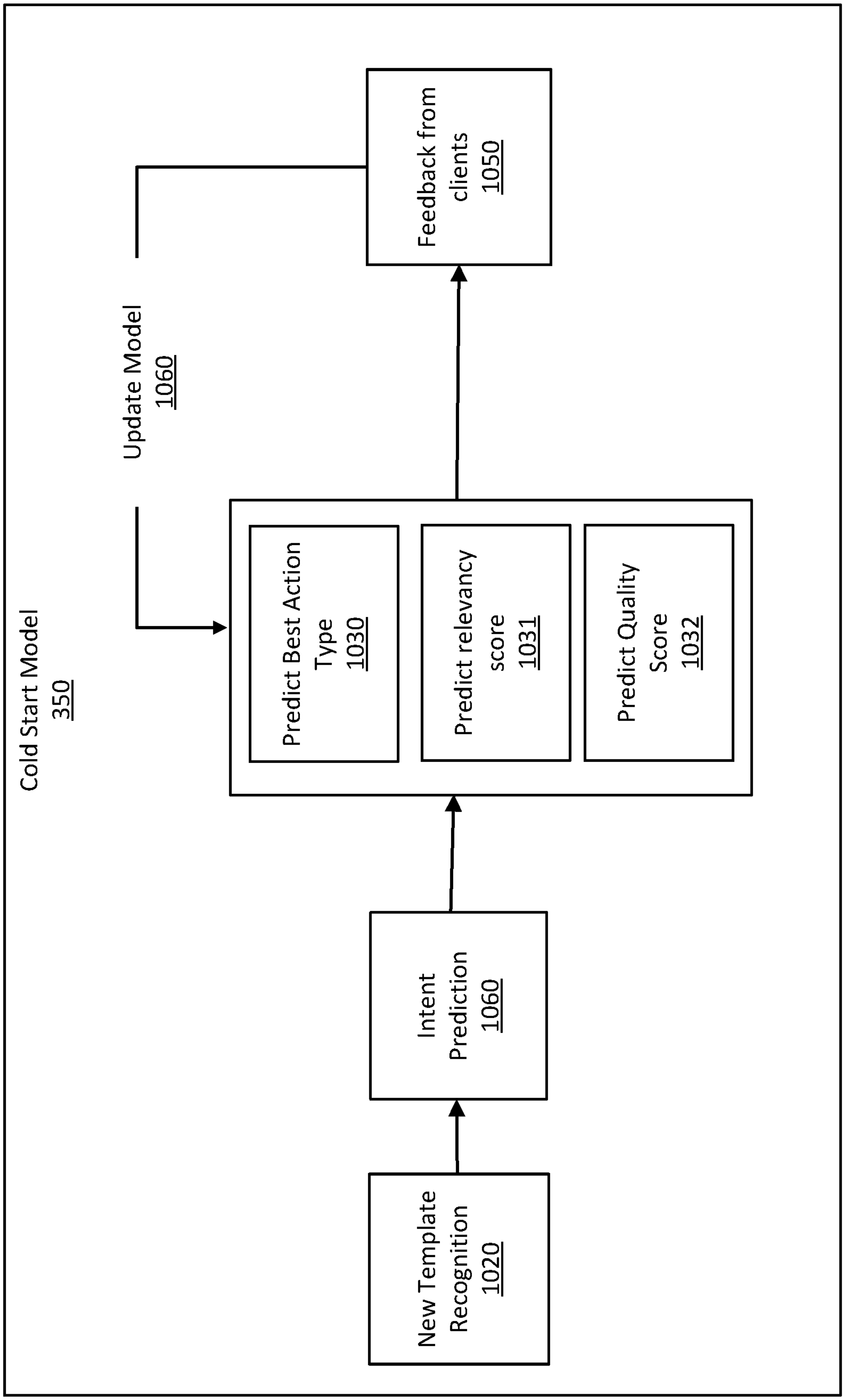
FIG. 10 illustrates an exemplary process for training a cold start model, according to an embodiment.

FIG. 10 illustrates an exemplary process for predicting an action for a cold-start situation, when insufficient data is available for a user with limited historical data. The process illustrated in FIG. 10 may start with new template recognition 1020 when a received template is not known to the workflow sentiment analysis system 131. The cold start model 340 may search through a repository that stores templates provided by users and determine if the template is in the repository. In one embodiment, each known template may be associated with an ID (identity) number and the cold start model 350 may determine whether a template is seen before by searching through the ID numbers. In one embodiment, the cold start model 350 may predict an intent 1060 associated with the response using the transformer model 430 as described in accordance with FIG. 4. The intent prediction 1060 may be predicted based on textual information of the body content of the response.

The cold start model may predict a 1030 best action type based on the predicted intent. In one embodiment, the cold start model 350 may predict a best action type based on historical interaction data with the predicted intent. An action type may be a category of actions for communication.

For example, an action type may be a messaging application such as Slack, Microsoft Teams, SMS (short message service), video conferencing, etc. In one embodiment, an action type may also be a meeting marker on a calendar that offers a variety of modes of communication for a user. In one embodiment, an action type may be a webpage extension or a mobile application that is capable of sending push notifications including links or offers for a user. The cold start model 350 may use a machine learning model trained based on historical data including historical interactions data and historical success outcomes (e.g., successfully booked a meeting or received a positive reply.) In one embodiment, the historical outcomes may come from data of other users. For example, the historical data may be communication data between other users with their respective prospects (e.g., where other users have opted in to sharing data). In some embodiments, the historical data may be a mix of data of other users and the user's historical data. The cold start model 350 may predict a best action type based on the predicted intent. The prediction may be based on whether a type of action may yield a higher response rate from prospects. In some embodiments, the cold start model 350 may predict multiple best actions and an associated score for each best action. The multiple best actions may be determined based on a threshold on the score corresponding to each best action. In one embodiment, the predicted best action type may result in a higher reply rate regardless of the content that is communicated through the action type. For example, a best action for intent "objection—referral" may be a templated email, while for the intent "positive—need more information" may be a phone call.

The cold start model 350 may predict related templates based on predicted relevancy scores 1031. A relevancy score may indicate a similarity in context regardless of other aspects of the content, such as the quality of the content (which is separately evaluated by quality scores 1032). The cold start model 350 may determine the relevancy score only based on the similarity of the content. The cold start model 350 may determine one or more related templates that address a specific question or need in the received email reply. The cold start model 350 may train and use a machine learning model trained based on historical email pairs (e.g., a buyer reply with a seller response that received positive outcomes.) The historical data may be data of other users, data of a specific user, or a mix of data from both sources (e.g., where other users have opted in). The cold start model 350 may predict a relevancy score for a set of candidate templates for a predicted intent category and recommend one or more templates that are predicted to be related (e.g., with a relevancy score higher than a threshold which indicates a significant level of similarity) and address the concern raised in the email reply. For example, several templates may be used to respond to emails categorized as "objection—already has a solution," but a best response may be a response that addresses a specific solution mentioned in the reply email. The cold start model 350 may be trained to predict a higher relevancy score for responses that address the concern in the reply. The cold start model 350 may then predict a relevancy score for the current email with regard to a set of candidate templates. The cold start model 350 may then recommend one or more templates based on the prediction.

The cold start model 350 may predict quality scores 1032 based on textual information or historical data. The cold start model 350 may leverage knowledge associated with other templates that perform well (e.g., templates used by other users with reply rates higher than a threshold) and determine a semantic similarity between a candidate template and a high performing template. The cold start model 350 may determine a semantic similarity based on body text and/or subject of an email template. In one embodiment, the semantic similarity is determined using an NLP (natural language processing) model such as a transformers-based language model to embed the documents into a fixed length vector representation where distance metrics such as cosine similarity can be used. The cold start model 350 may also use unsupervised techniques such as k-means clustering (ex. k-means, k-medoids) and/or topic models, for identifying similar templates. The cold start model 350 may predict quality scores 1032 by using a trained machine learning model based on historical data such as known success outcomes from existing content. In one embodiment, the model is trained based on all historical data available across different users, such as successful email communications (e.g., email templates that received positive replies) between different users and associated prospects. When sufficient data is available for training a user-specific model, the cold start model 350 may train a user-specific model for the user based on the communication data between the user and prospects associated with the user. If sufficient data is not available for training a user-specific model, the cold start model 350 may use the model that is trained based on historical data associated with other users for predictions. The cold start model 350 may pass the predicted results 1040 to clients and gather feedback 1050 from clients. In one embodiment, the feedback gathering 1050 may calculate results automatically by user telemetry, for example, based on whether the users accept the recommended content or not, or whether the users use the recommended templates or labels. The collected feedback may be used as new labeled data which may be used to update 1060 the cold start model.

Figure 11:
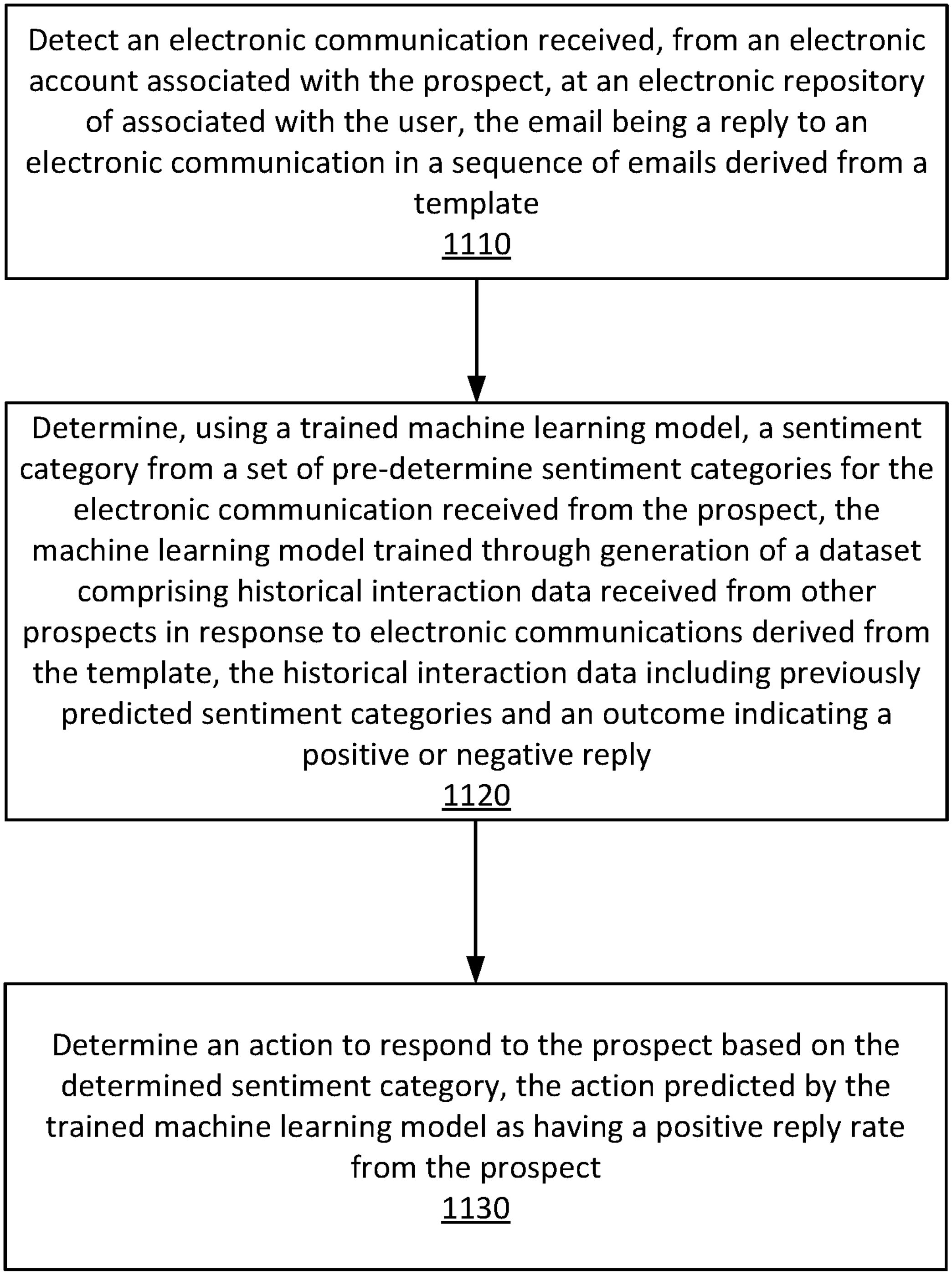
FIG. 11 illustrates an exemplary flowchart depicting a process for determining an action based on sentiment analysis of a piece of communication, according to an embodiment.

FIG. 11 illustrates an exemplary process for performing sentiment labeling based on an electronic response from a prospect to a sequence. The process 1100 may start with the sentiment analysis system 131 detecting 1110 an electronic communication received from an electronic account associated with the prospect. The electronic communication is received at an electronic repository of associated with the user. The email may be a reply to an electronic communication in a sequence of emails derived from a template. The sentiment analysis system 131 may determine 1120 a sentiment category from a set of re-determine sentiment categories for the electronic communication using a trained machine learning model. The sentiment analysis system 131 may train the machine learning model through generating of a dataset including historical interaction data received from other prospects in response to electronic communications derived from the template. In one embodiment, the historical interaction data may include previously predicted sentiment categories and an outcome indicating a positive or negative reply. The sentiment analysis system 131 may determine 1130 an action to respond to the prospect based on the determined sentiment category. In one embodiment, the action predicted by the trained machine learning model may have a positive reply rate from the prospect.

Computing Machine Architecture

Figure 12:
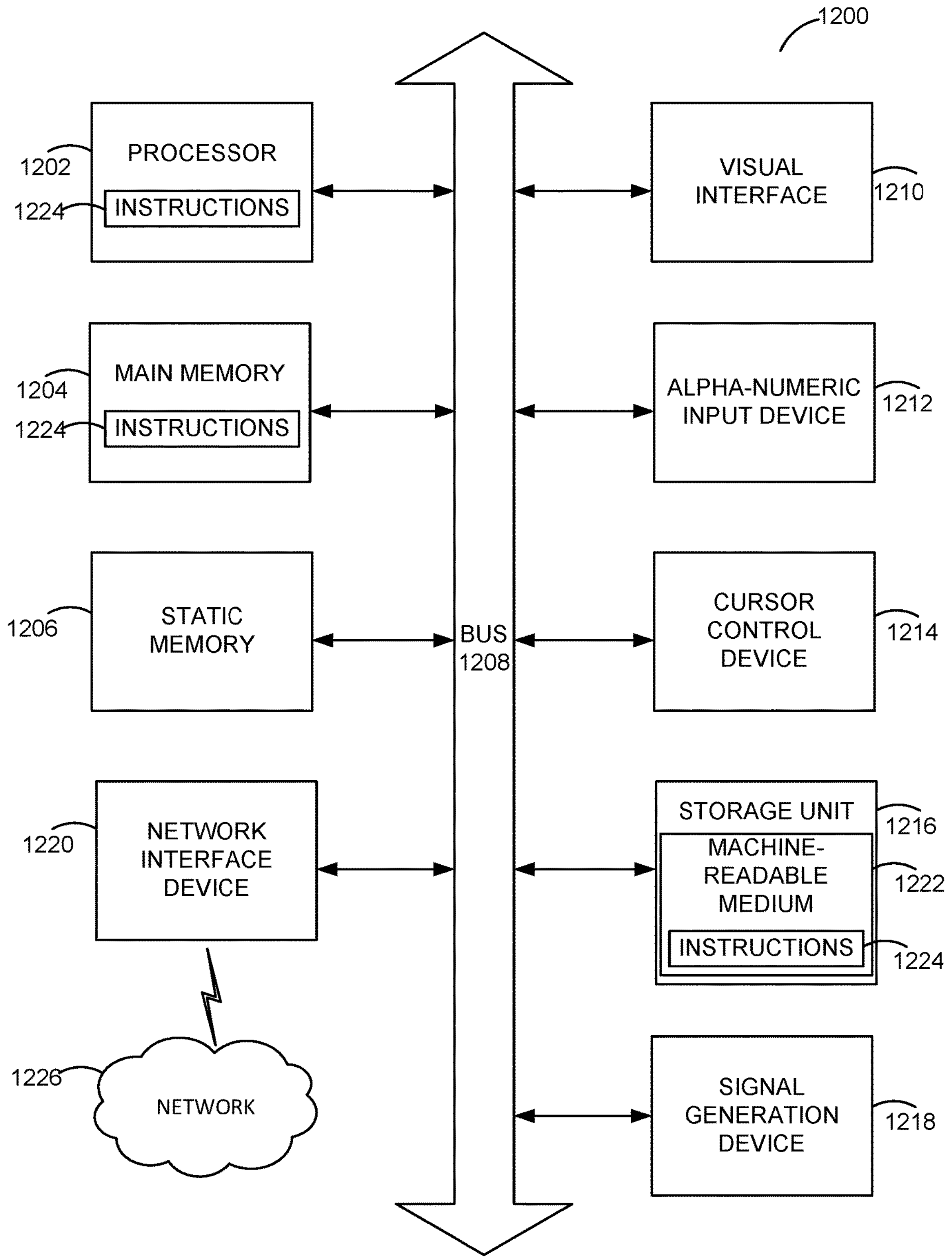
FIG. 12 illustrates a block diagram illustrating components of an example machine able to read instructions from a machine-readable medium and execute them in a processor (or controller).

FIG. 12 is a block diagram illustrating components of an example machine able to read instructions from a machine-readable medium and execute them in a processor (or controller). Specifically, FIG. 12 shows a diagrammatic representation of a machine in the example form of a computer system 1200 within which program code (e.g., software) for causing the machine to perform any one or more of the methodologies discussed herein may be executed. The program code may be comprised of instructions 1224 executable by one or more processors 1202. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. The program code executed on the machine may correspond to the functionality described with FIGS. 1 though 11. The program code would be stored in, for example, a storage until 1216 and executed by a processor 1202. One or more of the remaining components described with FIG. 12 may be optional with respect to system structured to store the program code corresponding to the functional aspects described in FIGS. 1 through 11.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include visual display interface 1210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1210 may include or may interface with a touch enabled screen. The computer system 1200 may also include alphanumeric input device 1212 (e.g., a keyboard or touch screen keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

The systems and methods disclosed provide several advantageous features for efficient management of workflows. For example, the sentiment analysis system may, based on content and metadata of an electronic communication, automatically assign a sentiment category for the electronic communication using a machine learning model trained on historical data labeled by human classifiers. The sentiment analysis system may further predict reply rates for one or more follow up actions based on the categorization. Furthermore, the sentiment analysis system provides a solution that handles the challenge of cold start problems where a user is not associated with enough data such as insufficient historical responses. The sentiment analysis system may predict a category and reply rates by leveraging response information associated with other templates or users. Further, the sentiment analysis system may train a machine learning model using a training dataset that is developed through a specific labeling process. The training data preparation process may first involve defining appropriate labels and developing a guide with criteria that define the labels. The guide may include samples and corresponding guidelines for each label. Qualified human classifiers may use the guide as a guidance for labeling texts and identifying keywords associated with the label. The labeling process may also be automated using machine learning models. Through the specific preparation process, the training dataset comprises comprehensive information associated with responses from prospects. The training dataset also helps to train the machine learning model to make accurate predictions because the training dataset is generated based on a comprehensive guide with a set of well-developed and appropriate labels. Further, the sentiment analysis system provides a user interface through which a user may view labeled texts and emphasized keywords for a more efficient information extraction and decision-making process.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for optimizing workflows through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising stored instructions encoded thereon that, when executed by a processor, determine an intent of an electronic communication between a user and a prospect by causing the processor to:

detect an electronic communication received, from an electronic account associated with the prospect, at an electronic repository of associated with the user, the electronic communication being a reply to an electronic communication in a sequence of electronic communications derived from a template, the sequence defining a pre-selected next action to be performed with respect to the prospect;

determine, using a trained machine learning model, a sentiment category from a set of pre-determined sentiment categories for the electronic communication received from the prospect, the machine learning model trained through generation of a dataset comprising historical interaction data received from other prospects in response to electronic communications derived from the template, the historical interaction data including previously predicted sentiment categories and an outcome indicating a positive or negative reply;

determine to replace the pre-selected next action in the sequence of electronic communications with a different next action based on the determined sentiment category;

determine an action to respond to the prospect that will replace the pre-selected next action in the sequence of electronic communications, the action predicted by the trained machine learning model as having a positive reply rate based on historical usage of the action yielding positive replies when used to respond to communications having the determined sentiment category;

determine a template for generating content for a replacement communication to be sent with the action; and output for display a recommendation to the user to perform the action using the template.

2. The non-transitory computer-readable medium of claim 1, wherein the instructions further comprise instructions that when executed by the processor cause the processor to:

determine that the user is not associated with a reply from another prospect, and further comprising instructions to determine the action that when executed by the processor cause the processor to:

categorize a set of templates provided by the user, wherein a second machine learning model is trained using a plurality of existing templates that are labeled based on the set of pre-determined sentiment categories;

predict, using the second machine learning model, a reply rate associated with each potential action for each category of the set of pre-determined sentiment categories; and determine the action based on the predicted reply rates.

3. The non-transitory computer-readable medium of claim 2, wherein the second machine learning model is trained further using data collected from other users, the data including the plurality of existing templates labeled based on the set of pre-determined sentiment categories.

4. The non-transitory computer-readable medium of claim 1, wherein the machine learning model is a transformer with the set of pre-determined sentiment categories as output labels.

5. The non-transitory computer-readable medium of claim 1, wherein the instructions further comprise instructions to generate the training data for each template, the instructions to generate when executed by the processor cause the processor to:

determine a language for the template;

select a set of potential categories through a set of options displayed through a user interface; and determine a primary sentiment category from the set of potential sentiment categories.

6. The non-transitory computer-readable medium of claim 1, wherein the set of sentiment categories include one or more of: a positive sentiment, an objection, an intent to unsubscribe, referral, and other intents.

7. The non-transitory computer-readable medium of claim 6, wherein the positive sentiment includes one or more of: willing to meet, conditional meeting, need information or other reasons;

the objection includes one or more of: already as a solution, prospect reach out, representative follow-up, financial reason, other reasons, or no reason;

the referral includes one or more of: specific contact, non-specific contact, or no contacts;

the other intents includes one or more of: customer service, job change, neural statements, or other intents.

8. The non-transitory computer-readable medium of claim 1, wherein the instructions to generate the training data is based on instructions that when executed by a processor cause the processor to generate a guidance, the guidance including labels, description for the labels and examples for each label.

9. The non-transitory computer-readable medium of claim 8, wherein the examples further comprise non-qualified examples.

10. The non-transitory computer-readable medium of claim 1, wherein the instructions further comprise instructions that when executed cause the processor to:

extract a portion of metadata a header of the electronic communication, and wherein the dataset further comprises the extracted portion of metadata, the metadata including information associated with the user.

11. The non-transitory computer-readable medium of claim 1, wherein the instructions further comprise instructions that when executed cause the processor to:

recommend, using a recommendation model, one or more templates based on a determination of the electronic communication, the recommendation model providing a recommendation of the one or more templates based on prior emails of the sequence for each of the one or more templates and associated customer responses.

12. A method for determining an intent of an electronic communication between a user and a prospect, the method comprising:

detecting an electronic communication received, from an electronic account associated with the prospect, at an electronic repository of associated with the user, the electronic communication being a reply to an electronic communication in a sequence of electronic communications derived from a template, the sequence defining a pre-selected next action to be performed with respect to the prospect;

determining, using a trained machine learning model, a sentiment category from a set of pre-determined sentiment categories for the electronic communication received from the prospect, the machine learning model trained through generation of a dataset comprising historical interaction data received from other prospects in response to electronic communications derived from the template, the historical interaction data including previously predicted sentiment categories and an outcome indicating a positive or negative reply;

determining an action to replace the pre-selected next action in the sequence of electronic communications with a different next action based on the determined sentiment category;

determining an action to respond to the prospect that will replace the pre-selected next action in the sequence of electronic communications, the action predicted by the trained machine learning model as having a positive reply rate based on historical usage of the action yielding positive replies when used to respond to communications having the determined sentiment category;

determining a template for generating content for a replacement communication to be sent with the action; and outputting for display a recommendation to the user to perform the action using the template.

13. The method of claim 12, further comprising:

determining that the user is not associated with a reply from another prospect:

categorizing a set of templates provided by the user, wherein a second machine learning model is trained using a plurality of existing templates that are labeled based on the set of pre-determined sentiment categories;

predicting, using the second machine learning model, a reply rate associated with each potential action for each category of the set of pre-determined sentiment categories; and determining the action based on the predicted reply rates.

14. The method of claim 13, wherein the second machine learning model is trained further using data collected from other users, the data including the plurality of existing templates labeled based on the set of pre-determined sentiment categories.

15. The method of claim 12, further comprising:

determining a language for the template;

selecting a set of potential categories through a set of options displayed through a user interface; and determining a primary sentiment category from the set of potential sentiment categories.

16. A system comprising:

memory with instructions encoded thereon; and one or more processors that, when executing the instructions, are caused to perform operations comprising:

detecting an electronic communication received, from an electronic account associated with a prospect, at an electronic repository of associated with a user, the electronic communication being a reply to an electronic communication in a sequence of electronic communications derived from a template, the sequence defining a pre-selected next action to be performed with respect to the prospect;

determining, using a trained machine learning model, a sentiment category from a set of pre-determined sentiment categories for the electronic communication received from the prospect, the machine learning model trained through generation of a dataset comprising historical interaction data received from other prospects in response to electronic communications derived from the template, the historical interaction data including previously predicted sentiment categories and an outcome indicating a positive or negative reply;

determining to replace the pre-selected next action in the sequence of electronic communications with a different next action based on the determined sentiment category;

determining an action to respond to the prospect that will replace the pre selected next action in the sequence of electronic communications, the action predicted by the trained machine learning model as having a positive reply rate based on historical usage of the action yielding positive replies when used to respond to communications having the determined sentiment category;

determining a template for generating content for a replacement communication to be sent with the action; and outputting for display a recommendation to the user to perform the action using the template.

17. The system of claim 16, wherein the one or more processors that, when executing the instructions, are further caused to perform operations comprising:

detecting an electronic communication received, from an electronic account associated with the prospect, at an electronic repository of associated with the user, the electronic communication being a reply to an electronic communication in a sequence of electronic communications derived from a template;

determining, using a trained machine learning model, a sentiment category from a set of pre-determine sentiment categories for the electronic communication received from the prospect, the machine learning model trained through generation of a dataset comprising historical interaction data received from other prospects in response to electronic communications derived from the template, the historical interaction data including previously predicted sentiment categories and an outcome indicating a positive or negative reply; and determining an action to respond to the prospect based on the determined sentiment category, the action predicted by the trained machine learning model as having a positive reply rate from the prospect.

18. The system of claim 16, wherein a second machine learning model is trained further using data collected from other users, the data including a plurality of existing templates labeled based on the set of pre-determined sentiment categories.

19. The system of claim 16, wherein the machine learning model is a transformer with the set of pre-determined sentiment categories as output labels.

20. The system of claim 16, wherein the set of sentiment categories include one or more of: a positive sentiment, an objection, an intent to unsubscribe, referral, and other intents.

* * * * *